United States Patent [19]

Conrad

[11] Patent Number: 4,574,191
[45] Date of Patent: Mar. 4, 1986

[54] WIDE FIELD-OF-VIEW LASER SPOT TRACKER

[75] Inventor: Raymond W. Conrad, Russellville, Ala.

[73] Assignee: The United States of America as represented by the Secretary of the Army, Washington, D.C.

[21] Appl. No.: 454,807

[22] Filed: Dec. 30, 1982

[51] Int. Cl.⁴ .............................................. G01J 1/20
[52] U.S. Cl. ............................ 250/203 R; 250/237 G
[58] Field of Search .................... 250/203 R, 201, 550, 250/237 G; 356/141, 152, 354, 355, 356, 363

[56] References Cited

U.S. PATENT DOCUMENTS

| | | |
|---|---|---|
| 3,970,269 | 7/1976 | Conforti ............................ 250/203 R |
| 4,279,036 | 7/1981 | Pfund ............................... 250/203 R |
| 4,330,212 | 5/1982 | Miller ................................... 356/354 |
| 4,371,264 | 2/1983 | Lacombat et al. .................. 356/356 |
| 4,413,909 | 11/1983 | Pohle ................................... 356/354 |

Primary Examiner—Davis L. Willis
Assistant Examiner—J. Gatto
Attorney, Agent, or Firm—Anthony T. Lane; Robert P. Gibson; Robert C. Sims

[57] ABSTRACT

A laser spot tracker having a wider field-of-view by the use of a phase diffraction plate to cause the focusing of a square array of spots upon a focal plane having a plurality of detectors thereon. Using the detectors to find the spot of the greatest intensity so as to cause the tracker to point towards the target of interest.

7 Claims, 7 Drawing Figures

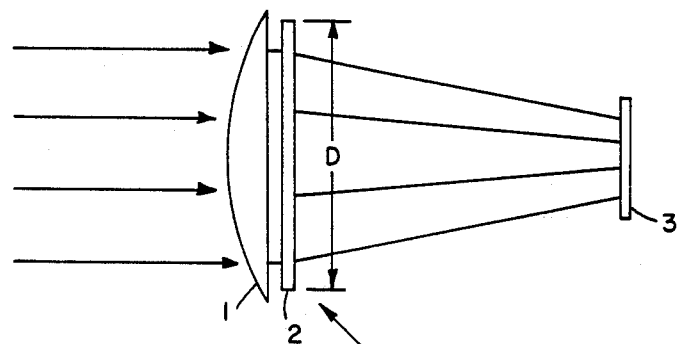
FIG. 1A
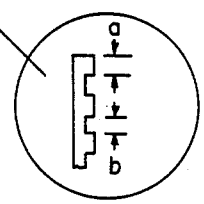
FIG. 1B
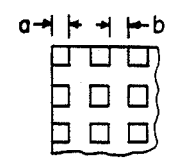
FIG. 1C
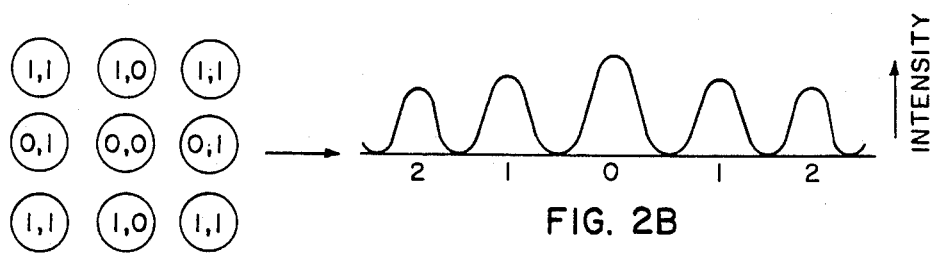
FIG. 2A
FIG. 2B
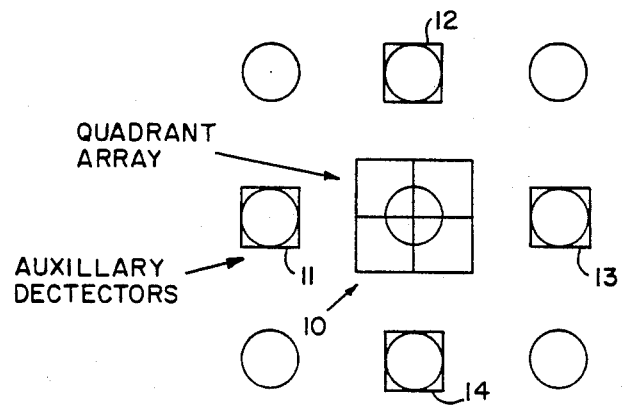
FIG. 3

WIDE FIELD-OF-VIEW LASER SPOT TRACKER

The invention described herein may be manufactured, used, and licensed by or for the Government for governmental purposes without the payment to me of any royalties thereon.

BACKGROUND OF THE INVENTION

The most widely used laser spot tracker techniques employ a conventional quadrant array of photodetectors located in or near the focal plane of a moderately fast optical system. The exact configuration of such systems is usually dictated by trade-offs between signal/noise considerations and field-of-view. For example, a wide field-of-view (FOV) is desirable because of ease of target acquisition and for maintainance of tracklock on rapidly maneuvering targets. A wide FOV however implies larger detector elements. Large detector elements are undesirable from the standpoints of single/noise and the fact that as the detector elements increase in size relative to the image spot size, there is a tendency toward a bang-bang or limit-cycle response. A complicating factor is the effect of atmospheric turbulence on the irradiance distribution at the tracker aperture. If the image is defocused to provide a larger spot size, then entrance aperture irradiance spatial and temporal fluctuations will produce similar fluctuations in the defocused image, with resultant spurious error signals.

A laser spot tracker which used a focused spot, to avoid the effects of scintillation, thus permitting the use of smaller detectors for an improved signal/noise ratio, yet had a wide field-of-view, would be desirable and useful.

BRIEF DESCRIPTION OF THE DRAWINGS

FIG. 1A is a diagram showing of the optics of the tracker;

FIGS. 1B and 1C show the details of the phased diffraction plate of FIG. 1A;

FIG. 2A illustrates a magnified view of the spot array at the focal plane of lens 1;

FIG. 2B illustrates the intensity variation of the spots of FIG. 2A along a row or columns containing the zero order;

FIG. 3 illustrates the focal plane of the detector once a selected spot has been centered upon the quadrant array.

DESCRIPTION OF THE BEST MODE AND PREFERRED EMBODIMENT

Figure 4:
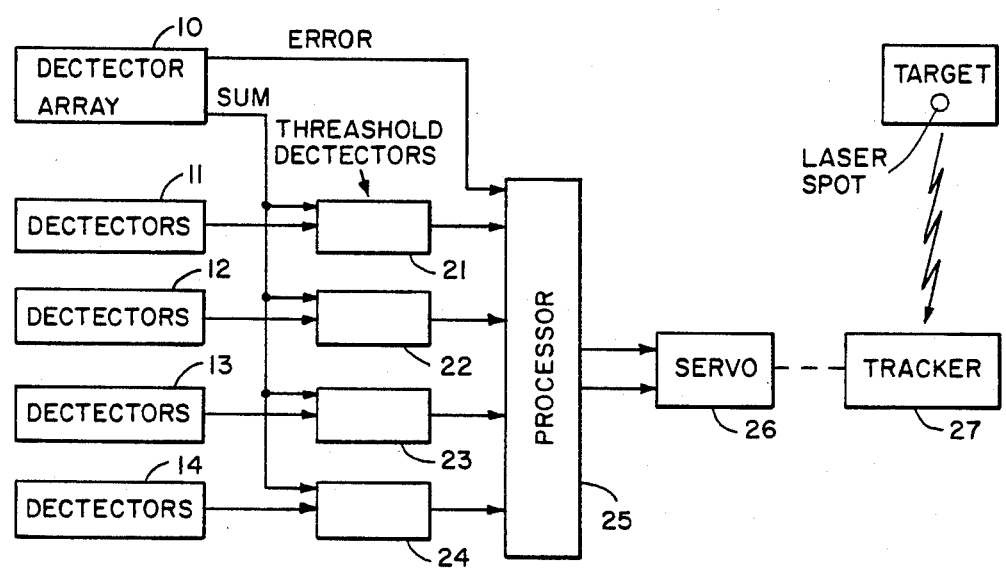
FIG. 4 illustrates in block form one possible circuit arrangement of the present invention.

FIG. 1A shows a sketch of the tracker. Radiation from a very distant object such as a laser spot is incident on the focusing lens 1. In close proximity to the lens is a phase diffraction plate 2 having plurality of square "pertubances" of size (a) and spacing (b) as shown in FIGS. 1B and 1C. Any of the well known phase diffraction plates can be used for plate 2. The radiation pattern at the focal plane 3 is a square array of spots shown in FIG. 2A, if the phase plate is a square array. These spots are identical except for irradiance. FIG. 2B shows the intensity variation along a row or column containing the (0,0) spot. Only the 0 and 1st orders are shown in FIG. 2A. Each higher order has lower amplitude of energy as shown in FIG. 2B. (See Optics by Eugene Hecht and Alfred Zajac, December 1976, pp 339, 352 and 462-508, Library of Congress #79-184159). If the entrance aperture irradiance distribution is uniform, the intensity of the light of each spot will have an Airy distribution with approximately radial symmetry.

The spacing of the spots is related to (a) of the phase plate. The width or diameter of the spots is related to the system aperture diameter. The irradiances of the various order spots can thus be manipulated by changing b/a.

FIG. 3 shows a sketch of the focal plane 3. The conventional quadrant array 10 is augmented with 4 additional detectors 11-14 suitably arranged so that the distance between the center of the quadrant array and the centers of the auxilliary detectors is precisely equal to the spacing between diffracted orders. The circles in FIG. 3 represent only the first two orders about the detectors. In addition the system is configured such that the width of the spots is slightly greater than the detector spacing. Therefore, there will always be some energy on the quadrant array, no matter what the relative relation between spots and the detector array.

When the tracker is activated, it first seeks a null on whichever of the spots happened to fall somewhere on the quadrant array at time t=0. This will align the spots up as shown in FIG. 3 so that each detector has a full spot on it. The center spot may or may not be the (0,0) spot. Next there is sufficient information on the eight periphery detectors at null, to determine if the nulled spot is the (0,0) spot and, if not, which way should the gimballed optic move to approach the (0,0) spot. The logic for this algorithm is gleamed from the fact that the irradiance of the 0th order spot is greater than the 1st order; the 1st order spots are greater than the 2nd, etc. One possible circuit configuration is shown in block form at FIG. 4. The signal Sum of the 4 quadrant detectors 10 is compared with each of the 4 auxilliary detectors 11-14 by way of threshold comparators 21-24 which have an output only if the signal sum is the lower input value. If the quad sum signal is greater than all of the auxilliary signals, the null is the (0,0) and the tracker is within range, and it can be guided solely by the quadrant array by means of conventional circuitry (not shown). Processor 25 will provide the proper activation signal. If the sum signal is greater than the left auxiliary but less than the right auxilliary, processor 25 causes servo 26 to move the tracker 27 so that the optics move the spots to the left a distance equal to the inter-detector spacing. The same is done with respect to top and bottom spacing. The process is repeated until the (0,0) null is located on quadrant detector 10. Any well known processor can be used with only obvious design programming or circuit changes.

I claim:

1. A system for optically tracking radiation emissions from a distant target comprising focusing means for receiving and focusing said radiation emissions onto a focal plane; a phase diffraction device placed in space relationship to the focusing means so as to cause an array of spots to appear on the focal plane; each spot being of a predetermined size and each spot being of a predetermined distance from adjacent spots; a plurality of radiation detectors located on the focal plane and spaced from each other in the same manner as the spacing of said spots; and tracking means connected to said radiation detectors, phase diffraction device and focusing means so as to cause said system to track said target.

2. A system as set forth in claim 1 wherein the phase diffraction device causes the spots to be varied in radiation intensity inversely proportional to the distance a spot is from a given spot which represents the center of a line pointing directly to said radiation emissions; and said detectors being five in number with a center detector surrounded by four auxilliary detectors located radially about it in a 90° intervals.

3. A system as set forth in claim 2 wherein said center detector is a quadrant array; circuit devices connected to said center detector so as to first center a spot falling on said center detector and then comparing the intensity of that spot with the intensity of the spots falling on each of the auxilliary detectors; and said circuit causing a one predetermined distance movement of the spots toward any spot which is detected to have a greater intensity than the spot on said center detector.

4. In a radiation tracker which is to track radiation coming from a distant target the improvement being a method comprising the steps of focusing the radiation onto a focal plane such that it will appear as a plurality of radiation spots which are identically sized and spaced from each other in a square array; causing said spots to have an Airy distribution with radial symmetry with an intensity distribution of each spot being inversely proportional to its distance from a given spot which represents the pointing direction to the radiation on the target; locating a radiation detector device in the focal plane; detecting the intensity of a spot centered on said detectors and comparing this intensity with spots above and below; moving said tracker so that the spot with the greater intensity will be centered on the detector if either the spot above or the spot below has a greater intensity than the spot located on the detector; comparing the intensity of the spot centered on the detector with spots located to the left and to the right; moving the tracker so as to locate the higher intensity spot onto the detector if either the left or the right spot is of a greater intensity; and repeating the last two steps until the given spot of the greatest intensity is located on said detector.

5. A method as set forth in claim 4 further comprising step of centering the center spot about the detector before determining the relative intensities of the spots.

6. A method as set forth in claim 5 further comprising the step of utilizing a center quadrant array detector surrounded by 4 auxilliary detectors located in pairs up and below and to the left and to the right of the quadrant array detector; spacing said auxiliary and quadrant array detectors equal to the spacing between spots; and utilizing the quadrant array detector to align the center spot.

7. A method as set forth in claim 6 further comprising the steps of causing the width of the spots to be greater than the spacing between the detectors.

* * * * *